No. 729,450. PATENTED MAY 26, 1903.
R. P. TOMASSEK.
CAR WHEEL.
APPLICATION FILED MAY 14, 1902.
NO MODEL. 2 SHEETS—SHEET 1.
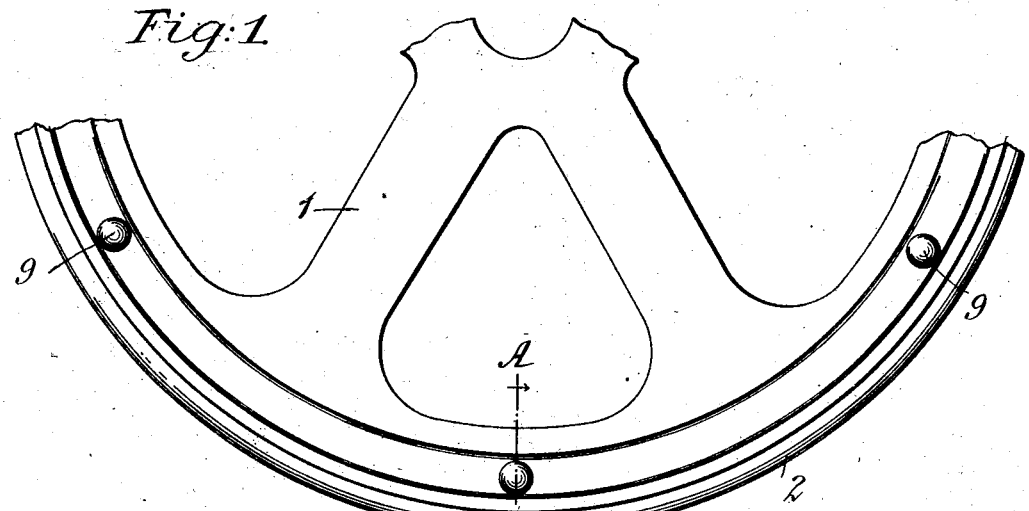
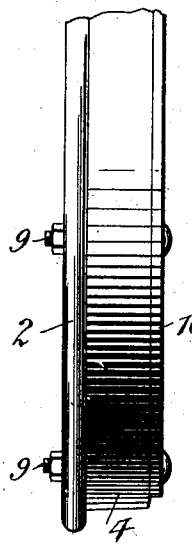
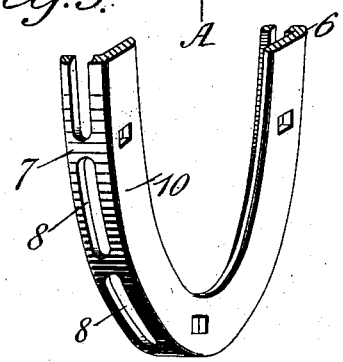
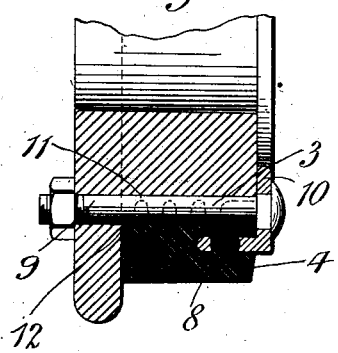
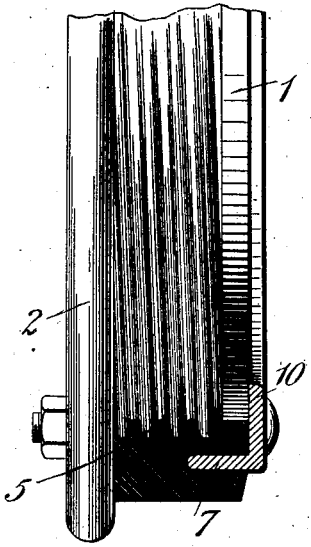
Witnesses:
John A. Rennie
George Barry Jr.
Inventor:
Romeo P. Tomassek
By Brown & Seward
his Attorneys

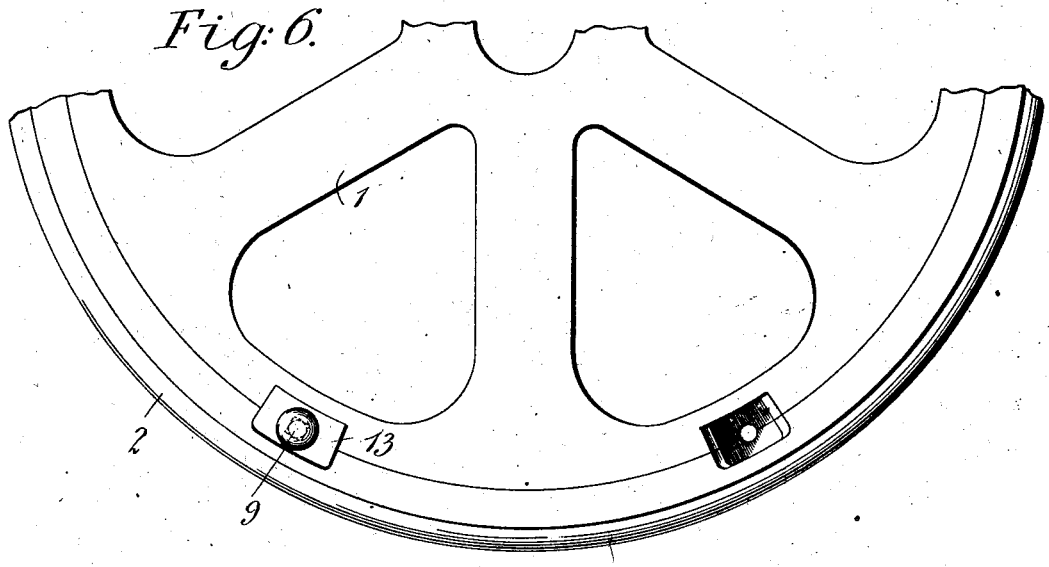
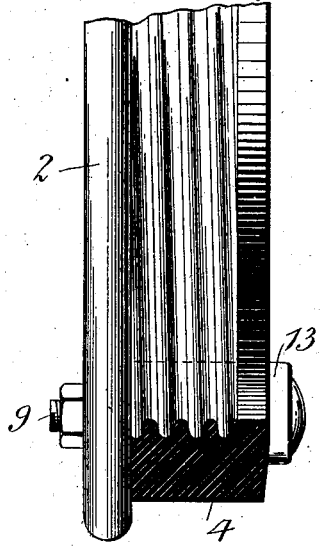
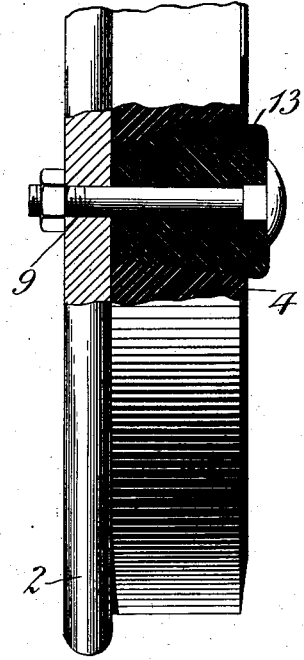

No. 729,450. Patented May 26, 1903.

UNITED STATES PATENT OFFICE.

ROMEO P. TOMASSEK, OF NEW YORK, N. Y., ASSIGNOR OF ONE-HALF TO THOMAS H. REYNOLDS, OF NEW YORK, N. Y.

CAR-WHEEL.

SPECIFICATION forming part of Letters Patent No. 729,450, dated May 26, 1903.

Application filed May 14, 1902. Serial No. 107,253. (No model.)

*To all whom it may concern:*

Be it known that I, ROMEO P. TOMASSEK, a citizen of the United States, and a resident of the borough of Manhattan, in the city and State of New York, have invented a new and useful Car-Wheel, of which the following is a specification.

My invention relates to a car-wheel, with the object in view of providing a structure which will run along a steel or iron rail with little or no noise and which will materially reduce the jar incident to what are commonly called "flat" wheels, and so increase the life of the track and the running parts in general.

It has been demonstrated that a good vulcanized-rubber tire will do good service under extremely heavy loads.

My present invention is directed particularly to the structure of a car-wheel which will permit of the ready adjustment and removal of a vulcanized-rubber tire and for holding the tire securely in position on the wheel no matter in which direction it may be rotated and no matter how great the load carried by it.

In the accompanying drawings, Figure 1 represents an outer view in elevation of a portion of a car-wheel embodying my invention. Fig. 2 is a partial face view of the same. Fig. 3 is an enlarged section in the plane of the line A A of Fig. 1. Fig. 4 is an enlarged partial face view showing the tire or tread and its retaining-rim in section. Fig. 5 is a view in perspective of a portion of a tire-retaining rim. Fig. 6 shows in elevation an outer view of a part of a wheel having the rubber tread secured by other means than that shown in Figs. 1 to 5. Fig. 7 is a face view of a part of the wheel, showing the tire or tread in section; and Fig. 8 is a partial face view of the wheel, broken away to show one of the tire or tread fastening devices in position.

The body of the wheel is denoted by 1. It is provided with the usual flange 2 for keeping it on the rail, and its face is provided with one or more spiral ribs 3, making it essentially a screw. The most efficient pitch, size, and number of these ribs 3 will depend upon the result of experience, and they may be varied to suit the varying conditions under which the wheel is to be used.

The vulcanized-rubber tire or tread is denoted by 4. It is provided on its interior with one or more spiral grooves 5, corresponding to the one or more spiral ribs 3 on the face of the wheel, so that it (the tire or tread) may be adjusted on the face of the wheel by a rotary movement—in fact, screwed onto the face of the wheel until its inner face abuts snugly against the face of the flange 2. When so adjusted, the movement of the wheel in one direction will tend to screw the tire or tread onto the wheel, and hence will hold it snugly in position. To guard against the loosening of the tire or tread by a rotary movement of the wheel in the opposite direction, I lock the tire securely in position. The preferred means for accomplishing this is shown in Figs. 1 to 5, inclusive, and consists of an annular rim 6, L-shaped in cross-section, the branch 7 of the rim being preferably provided with elongated slots 8 therethrough and molded into the body of the tire or tread, as clearly shown in Figs. 3 and 4.

The body of the tire or tread extending through the elongated slots 8 locks the tire or tread securely to the rim, and the rim itself is in turn locked securely to the outer face of the wheel by means of bolts 9, which extend through the branch 10 of the rim 6 and through sockets formed partly in the face of the wheel, as at 11, (see Fig. 3,) and partly in the tire or tread, as at 12, Fig. 3, and thence through the flange 2 of the wheel. This means of locking the rubber tire or tread to the wheel is very effective and at the same time forms a guard for the tire. It also admits of the ready removal of the tire when it has become too badly worn for further use and the replacement of a new tire without requiring skilled labor to make the change.

Instead of using the annular rim 6 for locking the rubber tire or tread to the face of the wheel I may employ wedge-shaped pieces 13 of hard rubber, (see Fig. 8,) seated partly in the inner face of the tire and partly in the face of the wheel, as indicated in Fig. 6, and held in position by bolts 9, quite similar to the bolts already referred to for holding the rim 6 in its position.

By using the vulcanized-rubber tires locked securely to the faces of the wheels, as hereinabove described, I provide a car-wheel which does away with the nuisance at present so generally complained of and resulting from the pounding of flattened wheels on the rails, while the durability of the tire has been practically demonstrated by running the tires eleven thousand four hundred and forty-five miles over rough roads on vehicles weighing five and one-half tons and having a capacity for seating eighteen passengers, and this without producing any considerable wear and tear on the tire.

Wheels constructed as hereinabove set forth have the advantage, therefore, of doing away with the flattening of the wheels, and hence pounding of the rails and jar of the vehicles. They are comparatively noiseless. They enhance the life of the rail and rolling-stock and afford ease and comfort to the occupant of the car.

What I claim is—

1. A car-wheel provided with a rubber tire or tread, the face of the car-wheel and the inner face of the tire or tread being provided the one with a spiral rib and the other with a spiral groove for receiving the rib whereby the rubber tire or tread may be screwed into position on the wheel and means for locking the tire in position.

2. A car-wheel provided with a rubber tire or tread, the face of the car-wheel and the inner face of the tire or tread being provided the one with a spiral rib and the other with a spiral groove for receiving the rib whereby the tire may be screwed in position on the face of the wheel, a locking device fitted to engage the tire or tread and the wheel and bolts for holding the locking device rigid with respect to the wheel.

3. A car-wheel provided with a rubber tire or tread, the face of the wheel and the interior face of the tire or tread being provided the one with a rib and the other with a groove for the reception of the rib, an annular locking device provided with a slotted branch embedded in the rubber tire or tread and with a branch adapted to rest against the side of the wheel and means for locking the said annular fastening device to the wheel.

In testimony that I claim the foregoing as my invention I have signed my name, in presence of two witnesses, this 13th day of May, 1902.

ROMEO P. TOMASSEK.

Witnesses:
FREDK. HAYNES,
HENRY THIEME.